United States Patent [19]

Ferrentino

[11] 4,193,301
[45] Mar. 18, 1980

[54] FLOW METER
[75] Inventor: Antonio Ferrentino, Monza, Italy
[73] Assignee: Industrie Pirelli S.p.A., Milan, Italy
[21] Appl. No.: 948,808
[22] Filed: Oct. 5, 1978
[30] Foreign Application Priority Data
   Jan. 13, 1978 [IT] Italy .................. 19227 A/78
[51] Int. Cl.² .............................................. G01F 1/22
[52] U.S. Cl. ............................... 73/207; 340/197
[58] Field of Search ............... 73/207, 716, 717, 718, 73/719, 720, 722, 706, 729, 747; 251/327, 326, 254, 251, 253; 116/277; 340/606, 539, 197; 137/487, 487.5

[56] References Cited

U.S. PATENT DOCUMENTS

| | | | |
|---|---|---|---|
| 2,035,472 | 3/1936 | Hammond | 73/207 |
| 2,092,019 | 9/1937 | Randel | 73/207 |
| 2,606,445 | 8/1952 | Eckman | 73/207 |
| 2,609,831 | 9/1952 | MacGeorge | 73/207 |
| 3,442,286 | 5/1969 | Anderson | 251/327 |

OTHER PUBLICATIONS

Float Type Flowmeter; Technical Information A Publication.
Brochure of Gervase Instruments Limited title: Electronic Process Control Instrumentation.
Brochure of Gilflo; title: Primary Elements for Flowrate Measurement of Liquids, Gases and Steam.

Primary Examiner—S. Clement Swisher
Assistant Examiner—Denis E. Corr
Attorney, Agent, or Firm—Brooks, Haidt, Haffner & Delahunty

[57] ABSTRACT

A flow-meter having a sliding lamina interposed between two chambers and movable to vary the flow therethrough in response to deviations in the pressure difference between the chambers to maintain a constant preset pressure difference for accurate measurement of instantaneous flow rates over a wide range. A cam surface relates linear variation in flow rates to non-linear variation in the area of the opening for fluid passage.

10 Claims, 4 Drawing Figures

FLOW METER

BACKGROUND OF THE INVENTION

1. Field of the Invention

The present invention concerns a flow-meter, i.e. a device for measuring the instantaneous flow rate of a fluid that flows into a conduit. The flow-meter according to the present invention is particularly, but not exclusively, useful for measuring the oil flow feeding an oil-filled electric cable.

2. DISCUSSION OF THE PRIOR ART

It is known that the measurement of the instantaneous flow of oil for feeding oil-filled cables (hereinafter referred to as O.F. cables) presents several technical problems which flow-meters that are usually employed do not resolve completely and simultaneously. A first problem is related to the wide range within which flow rate can vary. This range is extremely broad, from as low as 0.5 liters per hour to as high as 2,000 liters per hour.

Since known flow-meters do not have the capacity for measurement within such a wide range of values, in practice recourse is had to inserting into the oil feeding line a plurality of flow-meters having diverse capacities and working in parallel with each other; each of these flow-meters covers one limited range of values of the flow rate, so that together the several meters cover the whole required range.

A second problem is related to the desirability of measuring with great precision the instantaneous flow rate at very low values, approaching zero. Such measurement of very low rates of flow is difficult to accomplish because flow-meters generally operate by the displacement of moving parts such as a floating or deformable membrane or the like under the thrust of the fluid, and the mechanical inertia of such moving parts and extremely small displacements resulting from very low rates make such low flow rates difficult to register and to quantify. On the other hand, flow-meters specially designed for measuring very low flow rates are inadequate for measuring much higher flow rates.

Other limitations of conventional flow-meters are their inability to measure flow in both directions, and their inability to transfer the measurement data to a location remote from the point where the measurement is made.

SUMMARY OF THE INVENTION

The drawbacks of conventional flow-meters are overcome in accordance with the present invention, which provides a flow-meter capable of measuring instantaneous flow within a very wide range of values without sacrificing sensitivity.

The advantages of the present flow-meter derive from its capacity for measuring of instantaneous rates throughout any desired range, at a prefixed and constant value of the pressure difference upstream and downstream of the flow-meter.

Thus, the flow-meter of the present invention is particularly adapted for measuring the flow rate of oil that feeds an electric O.F. cable. The flow-meter of the invention has a body with a through-cavity, comprising a first and a second chamber intercommunicating through a suitable opening and a means capable of sensing the pressure differences existing between the two chambers, and means movable at least transversely to the flow direction of the fluid. The movable means serves to separate the first from the second chamber and also serves to vary the area of opening between the chambers, and the flow-meter includes means for displacing the movable means in such a way as to maintain between the chambers a prefixed and constant pressure difference for any rate and direction of the flow.

These and other advantages and features of the flow-meter according to the present invention will appear more fully from the following detailed description of a preferred embodiment of the flow-meter, especially when that description is read in conjunction with the accompanying figures of the drawings.

Brief Description of the Drawings

In the drawings, in which like reference characters designate like parts throughout.

DETAILED DESCRIPTION OF A PREFERRED EMBODIMENT

Figure 1:
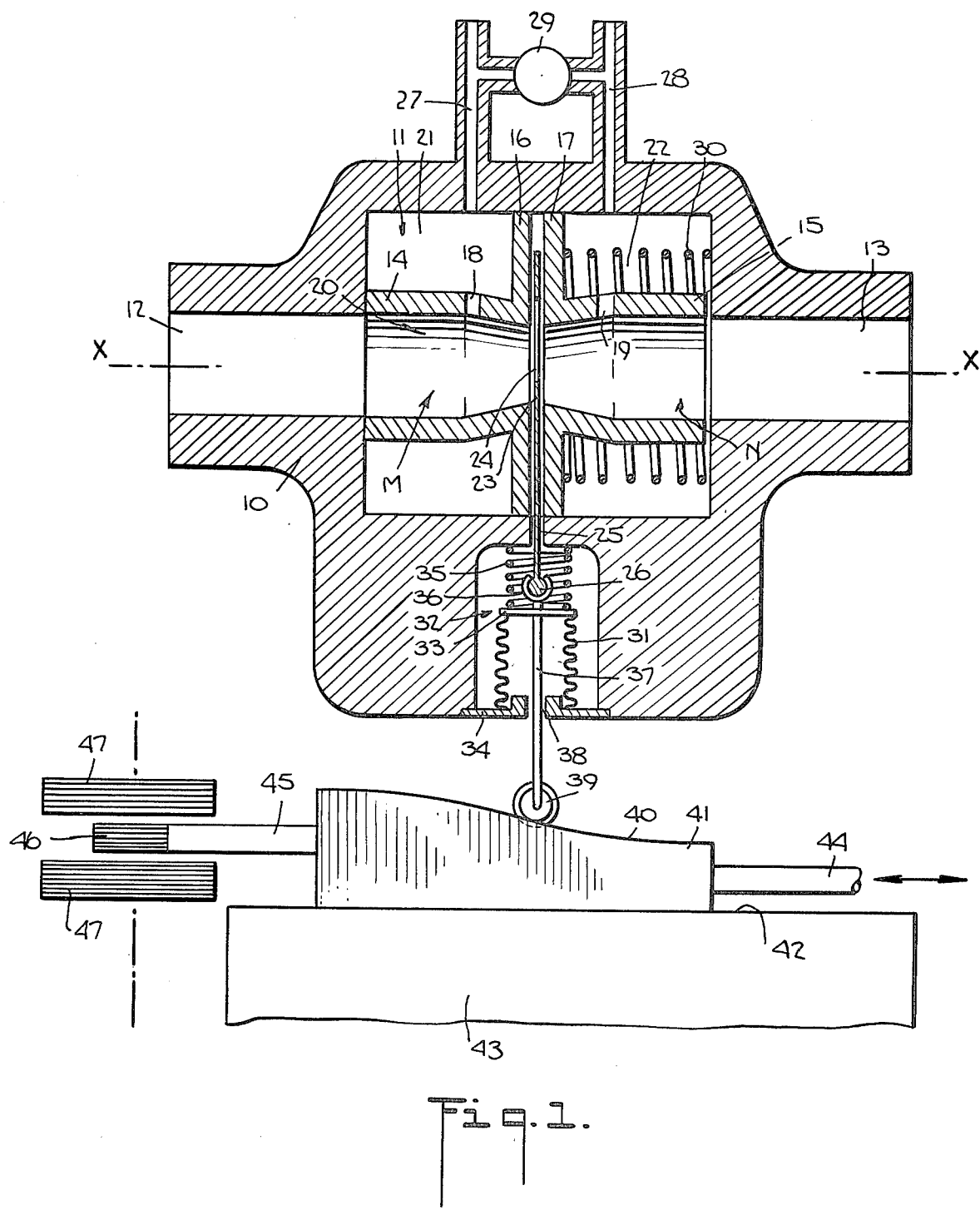
FIG. 1 is a view in longitudinal section of a flow-meter according to the invention.

As shown in FIG. 1, the flow-meter of the invention comprises a body 10, provided with a first cavity 11 in communication with a first and second conduits 12 and 13. Either of the conduits 12 or 13 can act alternatively as an entrance conduit or an exit conduit for the fluid, the flow-meter of the invention being able to measure instantaneous flow in both directions.

Within the cavity 11 there are fitted first and second tubular bodies 14 and 15 whose transverse dimensions are smaller than those of the cavity 11. Each of the bodies 14 and 15 has a flange, designated respectively 16 and 17, at one end and disposed generally perpendicularly to the axes of the tubular bodies 14 and 15 themselves. The bodies 14 and 15 are sized and shaped to fit closely within the interior of the cavity 11. Each of the tubular bodies 14 and 15 has a throughhole, respectively designated by reference numerals 18 and 19, extending transversely through the body to communicate pressure within the body to pressure sensing means.

The generally tubular bodies 14 and 15 are disposed in such a manner that their flanges 16 and 17 remain facing each other on opposite sides of a plane at the middle of the cavity 11 and their axes coincide with the axis X—X of the cavity 11. Thus the two tubular bodies 14 and 15 with their respective flanges 16 and 17 subdivide the first cavity 11 into three parts: a through-cavity 20 in communication with the conduits 12 and 13 and first and second toroidal chambers 21 and 22 surrounding the bodies 14 and 15 and separated by the flanges 16 and 17.

Between the facing walls of the flanges 16 and 17, there is disposed a means movable at least transversely with respect to the direction of the flow through the cavity 11. In the particularly preferred embodiment illustrated in FIG. 1 this movable means is a lamina 23 provided with a circular aperture 24.

The lamina 23 extends between the flanges 16 and 17 and through a lateral opening 25 of the body 10 and terminates in a ball 26. The said plane which is defined by the lamina 23 divides the through-cavity 20 into first and second chambers M and N communicating through an opening of variable area through which the fluid flows. The first and second toroidal chambers 21 and 22 communicate through the body 10 with a sensing means 29 via first and second passages 27 and 28 respectively. The passages 27 and 28 are shown continuing beyond the sensing means 29, since they may be connected to an arrangement for protecting the flow-meter against overpressure such as the one-way valve means illustrated in FIG. 3. The sensing means 29 is capable of registering the difference in pressure existing between the first and second chambers M and N. The sensing means 29 can, in our preferred embodiment, comprise a transducer and associated devices to be described in detail in conjunction with FIGS. 3 and 4. Inside the toroidal chamber 22, there is mounted a spring 30, disposed between the flange 17 and the opposed wall of the toroidal chamber 22. The spring 30 presses the opposed flanges 16 and 17 against the interposed lamina 23, while permitting the lamina 23 to slide between the opposed faces of the flanges 16 and 17. The sliding of the lamina 23 involves a closing, partial or total, of the circular section of the through-cavity 20. This produces a variation of the opening crossed by the fluid from a null value to a maximum value.

Figure 3:
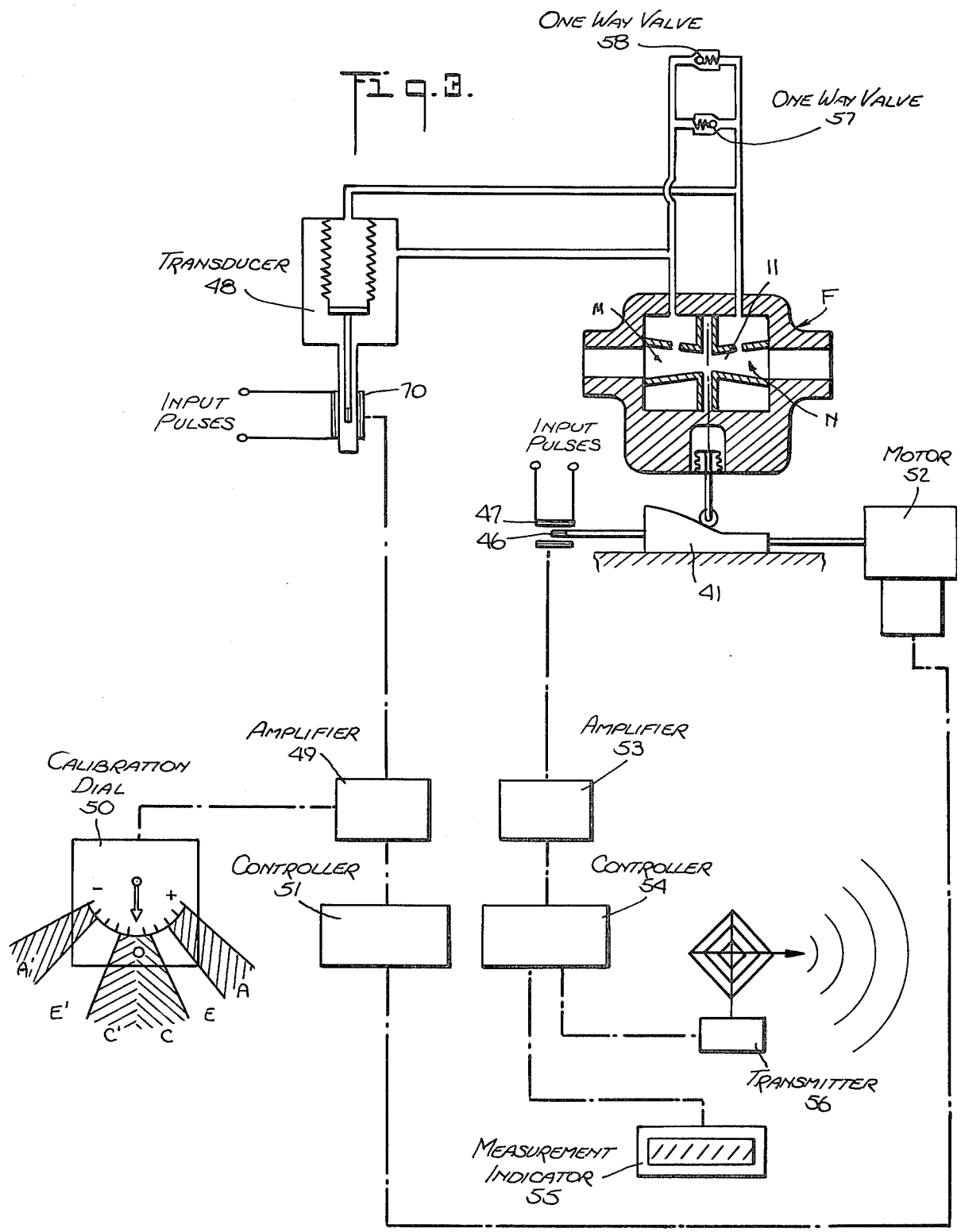
FIG. 3 schematically shows the flow-meter according to the present invention in association with other related devices.

The means for actuating the movable means, in the illustrated case the said lamina 23, comprise: a deformable and impermeable bellows 31 housed in a second cavity 32 of the body 10 and connected at one end to a surface of a piston head 33 and, at its other end, to a base 34. A spring 35 is disposed between the surface of the piston head 33 opposite to the membrane 31 and the opposed wall of the cavity 32. There is a socket or bushing 36, secured to the piston head 33, within which the ball 26 of the lamina 23 articulates. A rod 37 fixed perpendicularly to the piston head 33 projects from the second cavity 32 through an opening 38. The rod 37 has a roller 39 rotating freely around an axis directed perpendicularly to the extremity of the rod 37 and is spring-biassed by means of the spring 35. The roller 39 rolls on the shaped surface 40 of a sliding-cam 41. The roller 39 thus constitutes a feeler for following the shaped surface 40 as a consequence of the displacement in the directions indicated by the arrows, of the sliding-cam 41 along the flat surface 42 of a fixed body 43. These displacements are caused by the movements of the shaft 44 which is connected at one end to the sliding-cam 41 and which, in the preferred embodiment, is connected at its other end to a coupling moved by a motor (as shown in FIG. 3). It is known in the art that the flow rate through an orifice is dependent upon the size of the orifice and the pressure at the opposite sides of the orifice. Thus, if the pressure difference between the fluid on the two sides of the orifice is maintained constant by varying the size of the orifice, then, a measure of the size of the orifice is a measure of the flow rate.

The sliding of the lamina 23 between the facing walls of the flange 16 and 17 and the consequent variations of the size of the opening or orifice through which the fluid flows take place in the following way: the displacement of the sliding-cam 41 causes the rotation of the roller 39 that follows the shaped surface 40 and makes the position of the piston head 33 vary within the second cavity 32; the movement of the piston head 33 is transmitted by means of the ball and socket 26, 36, to the lamina 23. The sliding-cam 41 has a shape adapted to create a correspondence between the non-linear variations of the said opening and the instantaneous and linear variations of the flow values. The position of the sliding-cam 41 thus corresponds to the measured rate of flow, and hence, by adjusting the position of the cam 41 until a predetermined pressure difference is read on the pressure sensing means 29 and suitably calibrating the positions of the cam 41, the flow rate between the conduits 12 and 13 can be determined. While the cam 41 could be moved manually to provide the desired information, it is preferred that the cam 41 be moved by a motor as described hereinafter.

Figure 2:
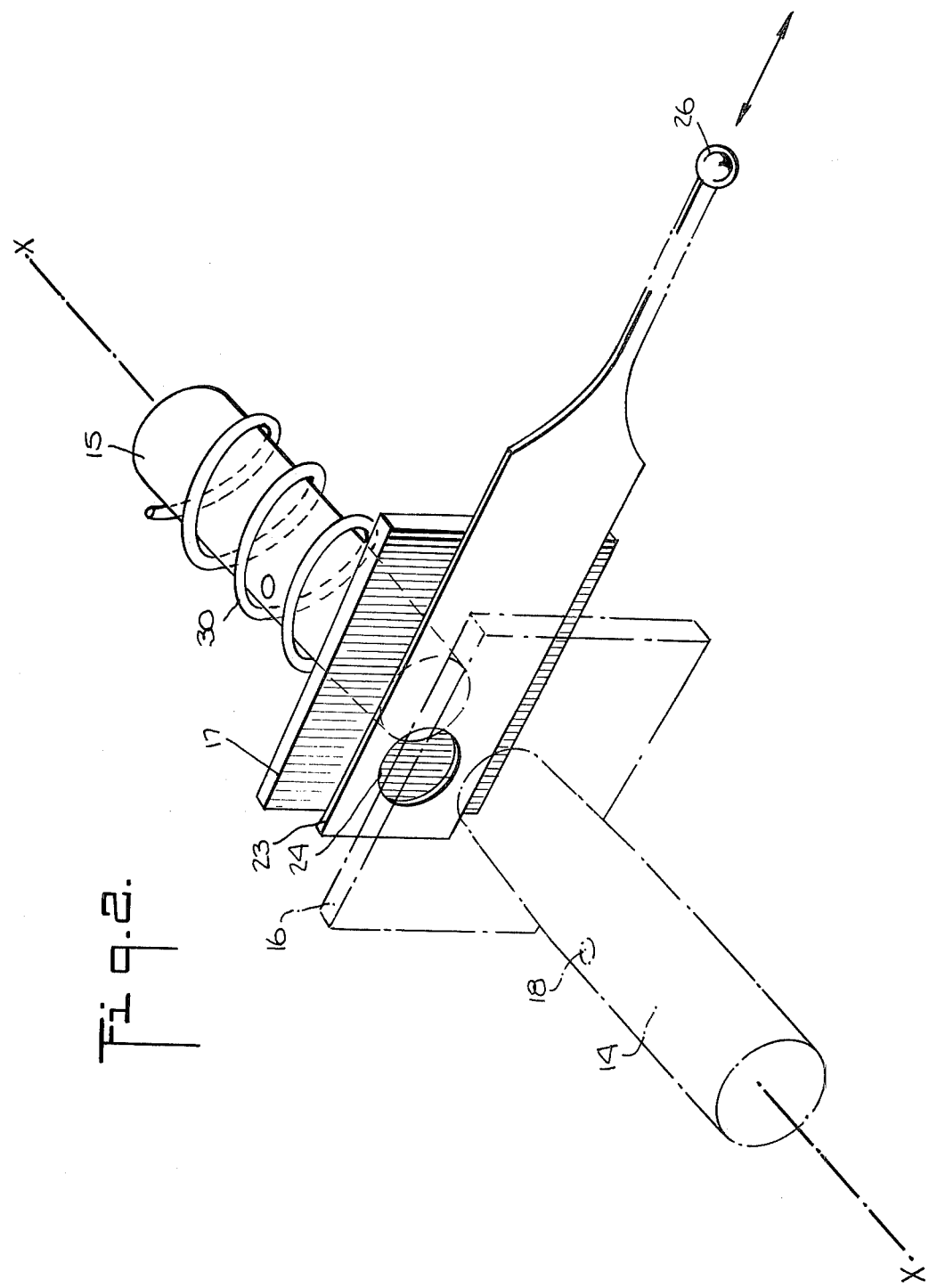
FIG. 2 is a detail view in perspective of the means capable of varying the area of opening of the flow-meter in FIG. 1.

The position of the lamina 23 between the flanges 16 and 17, and also its functions are shown in detail in FIG. 2.

In the preferred embodiment, the sliding-cam 41 is provided with means capable of generating electrical impulses proportional to the instantaneous and linear variations of the flow values, consisting of a rod 45 terminating in a magnetic core 46, which, guided by the reciprocating movement of the sliding-cam 41 is inserted more or less deeply between the windings of a differential transformer 47, varying the output electric impulses.

FIG. 3 schematically illustrates a particular application of the flow-meter according to the present invention. It can be observed that the flow-meter F presents along the through-cavity 11, first and second chambers M and N which communicate with a means capable of registering the differences of fluid pressure between the said two chambers which, in the example of the preferred embodiment is a transducer 48 that produces electrical impulses dependent upont the pressure difference between the fluids in the chambers M and N. The electrical impulses from the transducer 48 are amplified by a first amplifier 49 and the amplified signal is passed to the calibration dial 50 and to a first controller 51. From the controller 51 electrical signals are sent out for commanding a motor 52 that acts on the sliding-cam 41, the movement of which, as already observed with references to FIGS. 1 and 2, allows for varying the opening through which the fluid must pass. Movement of the said sliding-cam 41 produces in its turn electrical impulses at the output of the transformer 47 that are amplified by a second amplifier 53 and sent to a second controller 54. The amplified measurement signal from the second controller 54 is passed to a measurement indicator 55, indicating, numerically or in other suitable ways, the instantaneous flow values, and/or to a radio transmitter 56 for transmitting a signal representing the flow rate measured to remote stations.

In communication with the chambers M and N there are also disposed first and second one way over-pressure valves 57 and 58 that operate in parallel and pass fluid in opposite directions to each other. Each of said valves allows for the flow of fluid in a single direction and in coincidence to a difference of pressures between the said two chambers M and N and which is higher than a preset value.

The operation of the flow-meter according to the present invention in the particular application given in FIG. 3, can be described as follows:

In this discussion the symbol $\Delta p$ indicates the difference between the fluid pressures in the two chambers M and N of the through-cavity of the flow-meter F and the convention is adapted that said symbol $\Delta p$ has a positive value when the pressure in M is greater than the pressure in N, that is, the fluid flows from M and N when $\Delta p$ is positive. Under these conditions ($\Delta p > 0$) the transducer 48 sends through the amplifier 49, an electrical signal to the calibration dial 50 such as to deflect or maintain the indicating pointer of dial 50 to the right of the zero value mark (in FIG. 3) into the positive sector of the dial marked in the figure with a plus sign (+). In the case of fluid flow in the opposite direction (from N towards M) $\Delta p$ will assume a negative value (pressure in M less than the pressure in N) and the electric signal in exiting from the transducer 48 will move the indicating pointer to the left of value zero into the dial sector marked with a minus sign (−).

The graduated scale of the calibration dial 50 is divided into two equal and symetrical parts, one to the right and the other to the left of zero. Each of the two parts is subdivided into three symetrical sectors indicated respectively by the letters C, E, A, and C', E', A'. The instruments are predisposed in such a way, that when the indicating pointer occupies the sectors designated by reference characters C and C', a command sequence is established through the amplifier 49, the controller 51, the motor 52 and the sliding-cam 41, with the final result of reducing the area of the opening crossed by the fluid. On the contrary when the indicating pointer occupies the sectors designated A and A' in FIG. 3, a command sequence is established having the final result of enlarging the opening for fluid flow through the meter F. In cases when the indicating pointer occupies the sectors designated E and E', there is not any command sequence, and hence, no variation in the meter opening takes place.

Since the operative principle of the flow-meter according to the present invention is that of carrying out measurements of varying instantaneous flow rate values at a pre-fixed value of $\Delta p$, it is evident that the calibration dial 50 must be pre-disposed in such a way that this value of $\Delta p$ corresponds to those indicated at dial sectors E or E'.

The shape of the sliding-cam 41 is such as to create a correspondence between the non-linear variations of the meter opening and the instantaneous and linear variations of the flow values, registered on the measurement indicator 55. The operation of the flow-meter according to the present invention can be described by considering the two following operative situations:

(1). There is no flow, that is, the fluid quietly fills the through-cavity 20, and the value of $\Delta p$ is zero. In this condition the calibration and the pre-disposition of the various devices are such that in the transducer 48 sends, by means of the amplifier 49, an electrical zero signal to the calibration dial 50. The sliding-cam 41 is then disposed by means of the controller 51 and the motor 52 in such a position as to send an electrical signal corresponding to a zero reading through the amplifier 53, and the controller 54, to the measurement indicator 55 and to the radio transmitter 56.

(2). The flow is not null, that is, the fluid runs through the opening 20 of the flow-meter F. It is supposed that the flow direction is from M to N; consequently $\Delta p$ is positive and the pointer of the calibration dial is shifted to the right of zero. Considering instantaneous situations, both at the time of turning on the flow-meter and also during the normal operation, there are three possibilities, with the value of $\Delta p$ equal to, higher or lower than the value of $\Delta p$ preset for taking measurements.

Whenever the $\Delta p$ is equal to the preset value and the pointer of calibration dial 50 is, therefore, in the dial sector designated E, the cam 41 will be in a position corresponding to the flow rate, and hence, no command sequence takes place; the measurement indicator 55 indicates the instantaneous value of the flow.

When $\Delta p$ is higher than the preset value, an instant must be considered when the instrument in "in equilibrium", and the flow begins to increase. The pointer of the calibration dial 50 moves in the dial sector marked A. This causes, as previously stated, a command sequence that produces (when the moment "in equilibrium" of the instrument is over) an increase in the area of the meter opening, with a consequent progressive diminution of $\Delta p$ and a new shifting of the pointer indicator to sector E. When the $\Delta p$ reaches the pre-fixed value and the pointer indicator is disposed in dial sector E, the measurement of the flow rate is shown on the measurement indicator 55.

If $\Delta p$ is lower than the pre-fixed value an instant in which the instrument is "in equilibrium" and the flow begins to diminish must be considered. The pointer indicator of the calibration dial shifts to sector C. This causes, as previously described, a command sequence that is inverse, with respect to the preceding case until $\Delta p$ reaches the value preset for measurement.

Figure 4:
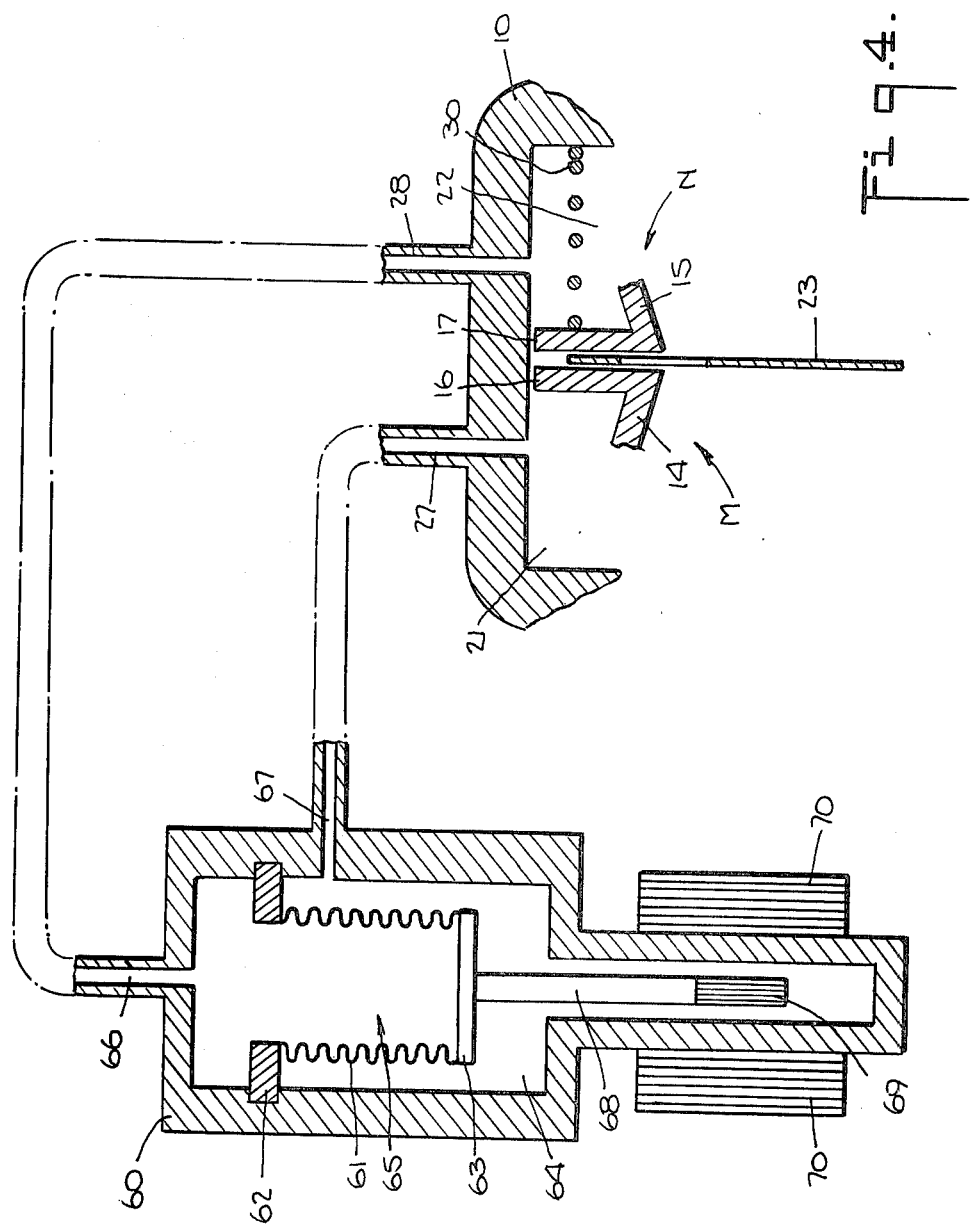
FIG. 4 schematically represents a detail view of FIG. 3.

FIG. 4 represents a preferred embodiment of the transducer 48 of FIG. 3. The transducer 48 is constituted by a cylindrical hollow body 60 housing a deformable and impermeable bellows or membrane 61 connected, at one end, to an annular member 62 and, at its other end to piston head 63. The bellows 61 and said piston head 63 define third and fourth chambers 64 and 65 which are not in direct communication, but communicate through the openings 66 and 67 respectively with the first and second toroidal chambers 21 and 22 of the meter cavity, which chambers 21 and 22 in their turn are in communication respectively with the chambers M and N of the through-cavity 20. The piston head 63 is joined to a rod 68 terminating in a magnetic core 69 disposed between the windings of a differential transformer 70. The operation of the transducer 48, which has the task of registering the pressure differences ($\Delta p$) between the chambers M and N and to emit corresponding electrical impulses, is as follows: the third and fourth chambers 64 and 65 contain the same fluid, having the same existing pressures respectively, as in the first and in the second chamber M and N of the through-cavity 20. On the basis of the difference between these two pressures the bellows or membrane 61 and the piston head 63 assume a certain equilibrium position; consequently the magnetic core 69 occupies a determined position between the transformer windings 70 with the resultant emission of a certain electrical signal corresponding to the position of the core 69 determined by the sensed pressure difference. If the fluid pressure difference between the chambers M and N undergoes a variation, the bellows 61 and the piston head 63 assume a new equilibrium position and hence the magnetic core 69 moves into a new position with respect to the transformer windings producing an electrical signal that is different from the preceding signal.

The function of the one way overpressure valves 57 and 58, as shown in FIG. 3, in parallel to the flow-meter and allowing flow in opposite directions to each other, is that of protecting the movable means acting in the through-cavity 20 of the flow-meter, and the means capable of sensing differences of pressure, from abrupt and possibly damaging variations of the flow, that is, from sudden increases (in absolute value) of $\Delta p$. An appropriate setting of the two valves 57 and 58 permits the by-pass of a part of the flow when the Δp reaches values that are dangerous for the security of the flow-meter.

Although a particular embodiment of the invention has been illustrated and described, numerous variations, modifications, substitutions of elements and adaptations of the invention will suggest themselves to those skilled in the art without departing from the spirit and scope of the invention.

What is claimed is. The embodiments of the invention in which an exclusive property or privilege is claimed are defined as follows:

1. A fluid flow-meter, particularly adapted for measuring the flow of oil that feeds an oil-filled electric cable, having a body including a through-cavity comprising first and second chambers and means defining an opening interconnecting said chambers, means for sensing differences in pressure existing in said first and second chambers, movable means positioned at said opening for varying the area of said opening through which fluid can flow, said movable means comprising a slidable lamina having an aperture therethrough, the lamina being arranged to slide transversely of the through-cavity and perpendicular to an axis of the through-cavity from position in which said aperture is aligned with said opening to a position in which said lamina blocks said opening, whereby sliding movement of said lamina varies the area of said opening through which fluid can flow to any condition from closed to fully open, and means for moving said movable means to maintain a preset and constant difference between the pressures in said chambers for any rate and direction of flow therethrough, said means for moving the movable means comprises a movable cam having a cam surface and wherein said lamina has a feeler connected thereto and engaging said surface, said cam being movable to vary the position of said lamina in accordance with the pressure difference between said first and second chambers.

2. A flow-meter according to claim 1, wherein said cam is shaped to create a correspondence between the non-linear variations of the area of said opening and the linear variations of the flow values.

3. A flow-meter according to claim 2 wherein said cam is coupled to means for generating electrical impulses proportional to instantaneous and linear variations in flow rate.

4. A flow-meter according to claim 3 wherein said cam is slidably mounted on a flat, fixed surface and said means for generating electrical impulses comprises a differential transformer having windings and a magnetic core attached to said cam for movement therewith and between said windings.

5. A flow-meter according to any of claims 2, 3 or 4 wherein said means for sensing pressure differences comprises a transducer in communication with said first and second chambers for converting instantaneous pressure differences into electrical impulses and further comprising a motor connected to said cam for moving the latter and control means connected to said transducer and to said motor for moving said cam, in accordance with the pressure difference between said first and second chambers.

6. A flow-meter according to claim 5 wherein said transducer has a hollow cylindrical body housing a deformable and impermeable bellows, one end of said bellows being connected to an internal wall of body, the other end of said bellows being connected to a piston, a third chamber and a fourth chamber separated by said bellows and piston and communicating respectively with said first and second chambers of the through-cavity, a differential transformer having windings, and a magnetic core connected to said piston and movable therewith and between said windings.

7. A flow-meter according to claim 5 and further comprising a calibration dial connected to said controller for indicating the pressure difference between said first and second chambers.

8. A flow-meter according to claim 4 further comprising a flow rate measurement indicator connected to said transformer for indicating the flow rate of the fluid through said flow-meter.

9. A flow-meter according to claim 4 further comprising a radio transmitter connected to said transformer for transmitting the output of said transformer.

10. A fluid flow-meter, particularly adapted for measuring the flow of oil that feeds an oil-filled electric cable, having a body including a through-cavity comprising first and second chambers and means defining an opening interconnecting said chambers, means for sensing differences in pressure existing in said first and second chambers, movable means positioned at said opening for varying the area of said opening through which fluid can flow, means for moving said movable means to maintain a preset and constant difference between the pressures in said chambers for any rate and direction of flow therethrough, and first and second one-way over-pressure valves connected to said first and second chambers, each of said valves allowing passage of fluid therethrough in a direction opposite to the other when the pressure difference between said chambers exceeds a limit value.

* * * * *

UNITED STATES PATENT AND TRADEMARK OFFICE
CERTIFICATE OF CORRECTION

PATENT NO. : 4,193,301
DATED : March 18, 1980
INVENTOR(S) : Antonio Ferrentino

It is certified that error appears in the above-identified patent and that said Letters Patent are hereby corrected as shown below:

Col. 7, line 26 - insert --a-- between "from" and "position".

Col. 8, line 16 - insert --said-- between "of" and "body".

Signed and Sealed this

First Day of July 1980

[SEAL]

Attest:

Attesting Officer

SIDNEY A. DIAMOND

Commissioner of Patents and Trademarks